SLOW RATE AGC CIRCUIT

Filed May 15, 1969 2 Sheets-Sheet 1

INVENTOR
ALAN G. FINKEL
BY Menotti J. Lombardi
ATTORNEY

SLOW RATE AGC CIRCUIT

Filed May 15, 1969 2 Sheets-Sheet 2

INVENTOR
ALAN G. FINKEL
BY [signature]
ATTORNEY 3,566,276
SLOW RATE AGC CIRCUIT Alan G. Finkel, Livingston, N.J., assignor to International Telephone and Telegraph Corporation, Nutley, N.J., a corporation of Delaware
Filed May 15, 1969, Ser. No. 824,871
Int. Cl. H04b *1/16*
U.S. Cl. 325—409 10 Claims

ABSTRACT OF THE DISCLOSURE

A slow rate AGC circuit which generates a slowly rising AGC voltage across a capacitor by a pulsed charging source. This circuit functions in an RF circuit which responds to a received signal within prescribed limits.

CROSS-REFERENCE TO RELATED APPLICATION

Ths application is related to, and incorporates by reference, the application of E. C. Karras entitled "Automatic Alarm Detector," filed May 5, 1967, Ser. No. 636,466, now Pat. No. 3,515,182. This previous application defined a system for monitoring of international distress signals. The system employs an RF circuit which responds to all the signals in the frequency range of interest. The RF signals are fed to two analog-to-digital translators; one of which supplies a control signal to an automatic gain control circuit to control amplification in the RF circuit, and the other of which supplies DC pulses according to the intelligence in the original RF signals. The DC pulses are then employed in logic circuits which provide an output signal if: (1) at least four consecutive pulses are present, (2) the pulses are of duration of 3.5 seconds to 6 seconds, and (3) the pulses are separated by time intervals of between 10 milliseconds and 1.5 seconds duration.

BACKGROUND OF THE INVENTION

The receiver, as described in the preceding application, is used to indicate to associated logic circuitry the presence of a signal above the receiver threshold. The receiver is designed for keying the associated logic circuitry in a manner most conducive to receive the International Signal in the presence of heavy radiotelegraph and/or atmospheric interference. The receiver is generally of the tuned radio frequency type. All frequencies and spurious frequency responses are minimized by using exceptionally selective filters.

The gain of the receiver is automatically controlled by a specially devised automatic gain control (AGC) circuit. The function of this circuit is to maintain the receiver under the varying conditions, in a condition in which the receiver can most readily respond to the alarm signal. This AGC circuit eliminates the need for frequent manual adjustments of auto alarm gain control. This circuit, unlike conventional AVC, is not controlled by amplitude of the received signal. This eliminates the possibility of a stronger intermittent interfering signal capturing the receiver with a consequent loss of a weaker alarm signal. The magnitude of the gain controlling voltage in the auto alarm is determined by the average duty cycle (signal-on to signal-off ratio) of the total signal and noise input to the receiver. Over periods during which the total input to the receiver presents, on the average, at least one signal gap, 10 milliseconds or longer in duration, in a period of one second, the gain controlling voltage is stabilized at the value for maximum receiver sensitivity. Over periods of heavier atmospheric interference during which fewer gaps are discerned by the receiver, the gain controlling voltage decreases the receiver gain at a slow rate until the receiver becomes unblocked and gaps begin to appear at the receiver output. The receiver sensitivity is held at that level as long as the average noise remains the same. During this time, the receiver threshold hunts about the average noise level, effectively preventing the noise from locking up the logic circuits. A reduction in the average noise level allows the gain controlling voltage to increase the receiver gain to the maximum compatible with the new average noise level.

The logic circuits utilized in connection with this arrangement are as disclosed in the incorporated reference previously identified. The functions of the logic circuits are to time the duration of signal-on and signal-off intervals, to count the number of correctly timed dashes as received, to erase the dash storage on the reception of a dash or space outside the tolerances set for each, and to actuate the warning bells upon reception of four correctly timed and correctly spaced dashes.

SUMMARY OF THE INVENTION

Therefore, in keeping with the purposes indicated, there has been provided an improved slow rate AGC circuit which generates a slowly and linearly rising AGC voltage by a pulsed charging source.

According to the broader aspects of this invention, the AGC voltage is developed across a capacitor and is coupled to the gained control stages of the RF circuit. The capacitor is charged by short (approximately 10$\mu$) constant current pulses which are generated by an astable blocking oscillator, and are current controlled by a constant current generator.

BRIEF DESCRIPTION OF THE DRAWINGS

The following description of the slow rate AGC circuit as employed in the RF circuit will best be understood by reference to the accompanying drawings in which.

Only those positions of the arrangement are illustrated and described as is necessary for an understanding of the invention claimed herein over that disclosed in the incorporated reference.

DESCRIPTION OF THE PREFERRED EMBODIMENT

Figure 1:
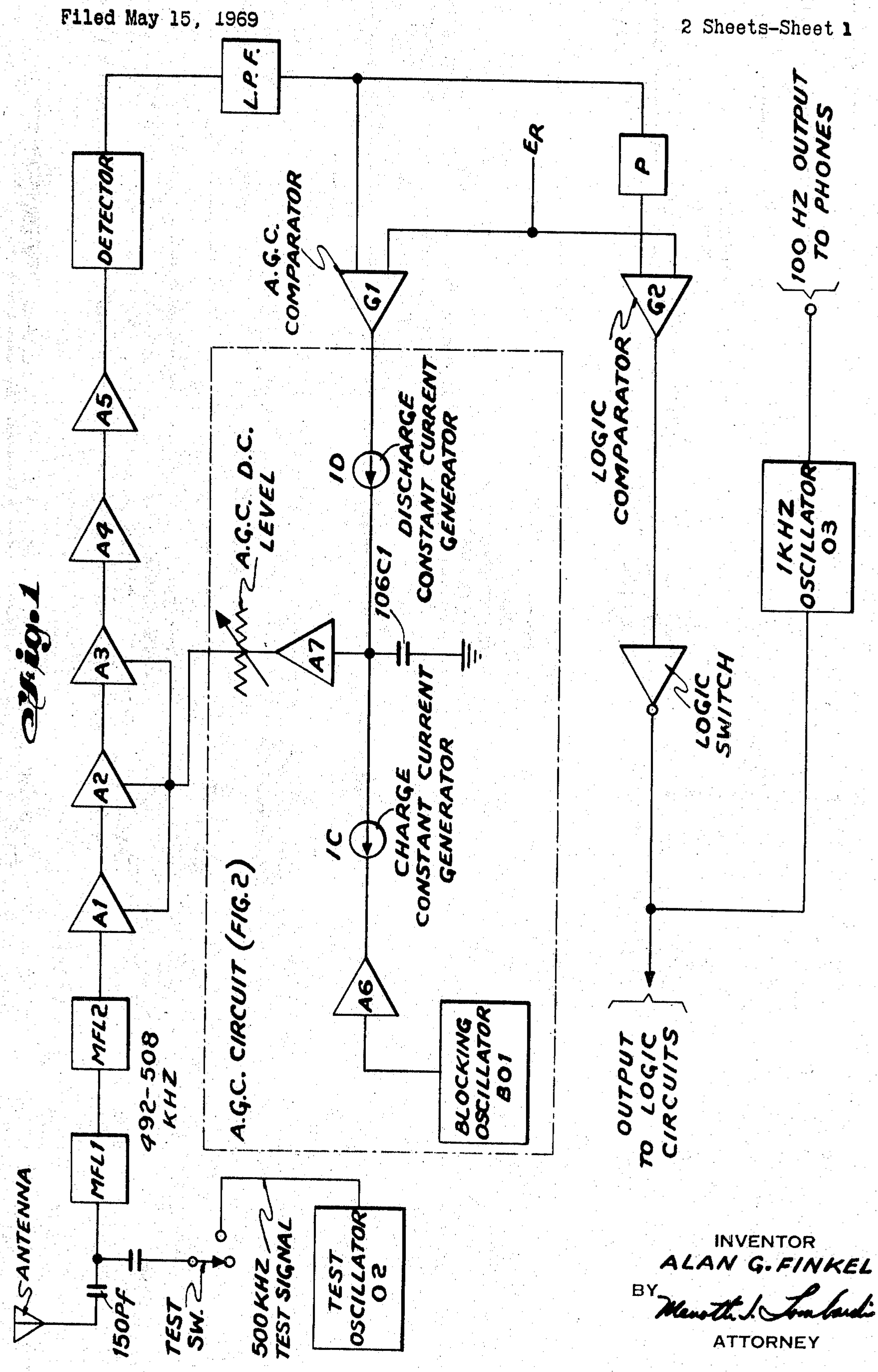
FIG. 1 illustrates the RF circuit according to the invention utilizing the AGC circuit which is indicated within the dash lines.

Referring now to drawings, the function of the circuit shown in FIG. 1 is to indicate to associated logic circuits the presence of signals above the received signal threshold. The circuit utilizes a tuned radio frequency circuit with a specially designed automatic gain control circuit (AGC). The output provides all pulses required for operation of the associated logic circuitry.

Upon receiving a signal (30 $\mu$v. to 1.5 v. RMS) 6 db above the existing noise level from the antenna, the 500 kHz. band pass filters MFL1, 2 attenuates all frequencies except those between 492 kHz. and 508 kHz. The remaining signal is then amplified by the RF amplifiers A1, A2, A3, A4, and A5 to approximately 0.2 v. RMS. A 150 pf. input capacitor is used to reduce antenna loading. Four dual-gate field effect transistors are used as cascaded single-tuned RF amplifiers for A1 through A4. The first three stages are gain controlled by applying the AGC voltage derived from the AGC circuit to the second gates of these devices. A5 is an emitter follower used to drive a voltage-doubling diode detector. Thus the amplified signal together with any accumulated noise is detected and filtered, by the low pass filter LPF, and coupled to AGC comparator G1, also having a reference input voltage $E_R$.

A 500 kHz. oscillator is manually keyed to the input to check the operation of the entire auto alarm circuitry. The oscillator O2 is capacitively coupled into the receiver antenna circuit.

When the input signal exceeds the receiver threshold by approximately 6 db, logic comparator G2 is turned on through 6 db pad P. The logic comparator G2 also has coupled the input reference voltage $E_R$, and when the comparator G2 is turned on, the subsequently coupled logic switch output goes to a level $l$ to drive logic circuit as shown in FIG. 3 of the cross-referenced application. This output from the logic switch also initiates a 1 kHz. oscillator O3 to produce a signal suitable to operate audio earphones whenever the logic switch is at a level $l$ and thereby provide an audible indication of the presence of received signals.

The AGC circuit is used to slowly reduce the receiver gain in presence of dense atmospheric or telegraphic interference, and to rapidly restore the gain to maximum when gaps occur on the interference. These requirements for rate of gain reduction and rate of gain increase are determined by the duration of valid dashes and spaces. For the values shown in FIG. 2 rate of gain reduction is approximately 0.2 db per second, so that at the end of a 6 second dash the gain will be reduced to 1.2 db. During the shortest space, 10 ms., the gain will be increased by at least as much as it was reduced during the longest (6 second) dash. In the circuit shown, the rate of gain increase is approximately 300 db per second.

The AGC voltage is proportional to the time that the receiver has been in the signal-on condition. Impulsive interferences does not build up AGC voltage, thereby allowing operation at maximum sensitivity. In the presence of dense interference the gain is reduced to the level at which the interference begins to present gaps within the resolving capability of the receiver. At this level, the gain is stabilized permitting reception of alarm signals at an amplitude somewhat greater than the average level of the dense interference.

Figure 2:
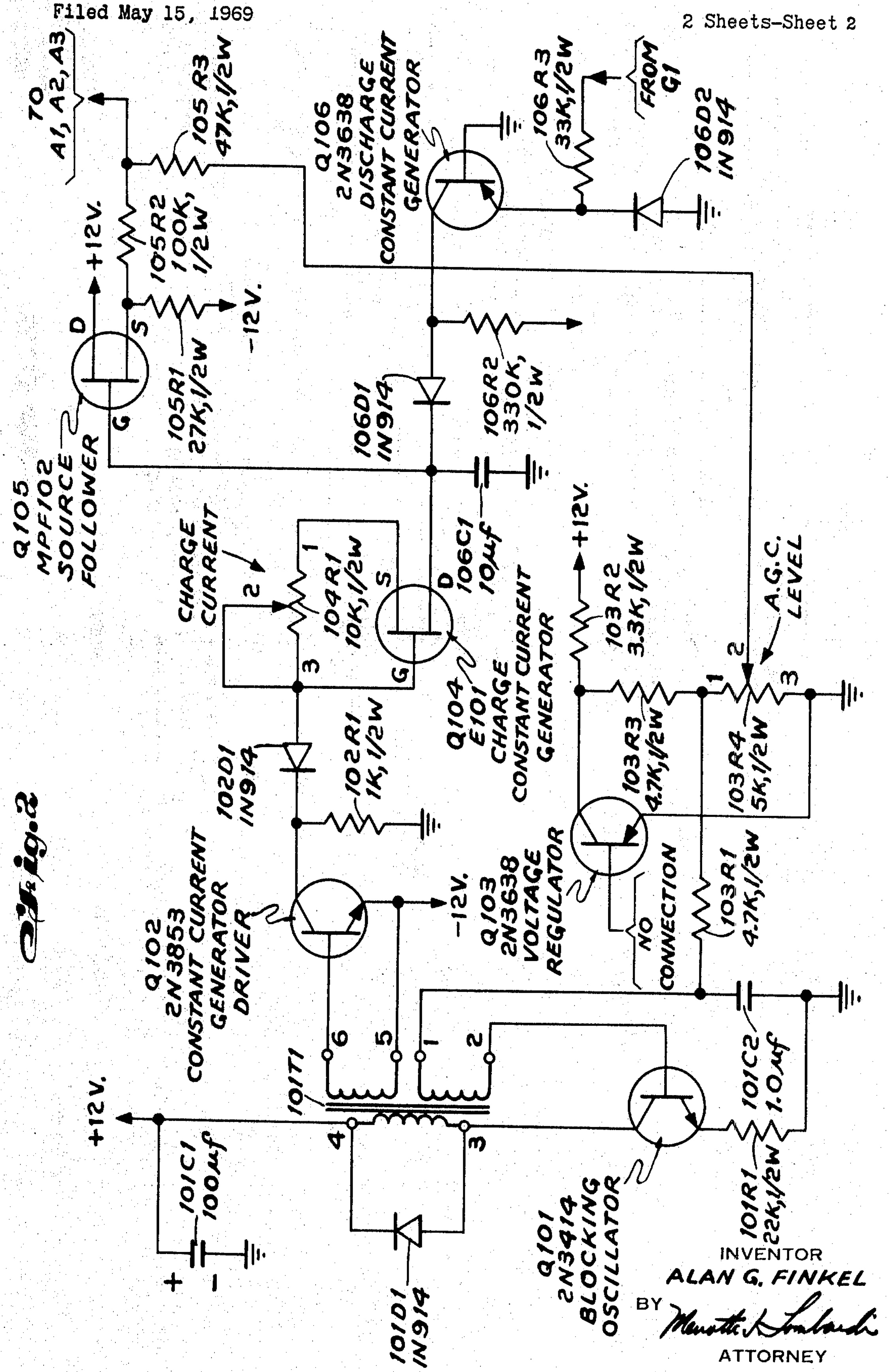
FIG. 2 illustrates a detailed embodiment showing the components utilized to implement the slow rate AGC circuit of FIG. 1.

Referring additionally to detailed implementation of the AGC circuit shown in FIG. 2, the output from the AGC comparator, G1, is coupled to the discharge constant current generator ID, Q106. The charge built on capacitor 106C1 is fed through source follower A7, Q105 to the A1, A2, A3 amplifiers. A blocking oscillator BO1 has its output coupled through amplifier A6 to control constant current generator IC and thereby control the charge on capacitor 106C1.

The AGC voltage, developed across capacitor 106C1 is fed to the gain control stages through the source follower Q105. A level setting control, resistor 103R4, is included-ed to set the AGC level voltage which is coupled to the gain control stages under zero signal conditions. The voltage regulator Q103 has no connection to its base, and it operates as a Zener diode to establish the voltage references across the level setting control. The capacitor 106C1 is charged by short (approximately 10 $\mu$s.) constant current pulses. The pulses are generated by an astable blocking oscillator BO1, Q101 and its output is coupled by transformer 101T1 to constant current generator driver A6, Q102.

The output pulses from constant generator driver Q102 are current controlled by charge constant current generator IC, Q104 which has its charge current controlled by adjusting charge current resistor 104R1.

When AGC comparator input drops below $E_R$ due to a decrease in received signal level, G1 turns-on causing current to flow in 106R3 and generating a constant current thru Q106, ID. 106C1 is rapidly discharged and gain to amplifiers $A_1$, $A_2$, $A_3$ is increased. Constant current generator Q106 shuts off at the instant reference voltage to G1 is exceeded. Capacitor 106C1 is then slowly charged by the pulled source. In the embodiment illustrated in FIG. 2, a rate of change of AGC voltage of 5 mv./second for gain reduction and 6.7 volts per second for gain increase. Approximate receiver gain change achieved to 0.4 db per second for gain reduction and 300 db per second for gain increase. Although there is described herein a technique for generating a slowly rising AGC voltage in connection with a particular receiver arrangement, this AGC circuit applies as well to any arrangement in which a linear slowly changing voltage is required.

I claim:

1. An RF circuit comprising:
- means for receiving RF signals within a prescribed bandwidth;
- a plurality of cascaded RF amplifiers coupled to said receiving means;
- detector and filtering means coupled to said amplifiers;
- an AGC comparator having one input coupled to said detector and filtering means and another input coupled to a reference voltage; and
- an AGC circuit including
  - a discharge constant current generator coupled to said comparator,
  - a capacitor across which is developed an AGC voltage, said capacitor being coupled to feed said AGC voltage to the gain-controlled stages of said RF amplifiers,
  - a charge constant current generator coupled to said capacitor, and
  - an astable blocking oscillator for generating charging pulses which are current controlled by said charge generator, whereby said capacitor is charged by short constant current pulses.

2. The circuit of claim 1 wherein said AGC circuit includes a source follower coupling said AGC voltage to said amplifier, and a level setting control means which sets the AGC voltage under zero signal conditions.

3. The circuit of claim 2 including a constant current driver coupling the charging pulses from said oscillator to said charge generator, and wherein when the received RF signals drop below a predetermined reference level, said AGC comparator turns on said discharge constant current generator so that the gain of said amplifiers is increased.

4. The circuit of claim 3 further comprising a logic comparator having one input coupled by a pad to said detector and filtering means and the other input to said reference voltage, whereby, when the received RF signals exceed the predetermined reference level, said logic comparator initiates a subsequently coupled logic switch.

5. An AGC circuit having a capacitor across which is developed an AGC voltage, comprising:
- a discharge constant current generator which is coupled to said capacitor at a common point;
- a charge constant current generator coupled to said capacitor at said common point;
- an astable blocking oscillator generating charging pulses which are current controlled by said charge generator and coupled to said capacitor; and
- output means coupled to said common point, whereby said capacitor is charged by short constant current pulses and is discharged when said discharge generator is initiated on.

6. The AGC circuit of claim 5, wherein said output means includes a source follower coupled to said common point and an AGC voltage level control to set the AGC voltage under zero signal conditions.

7. The AGC circuit of claim 6 wherein said AGC level control includes a voltage regulator and a variable resistor, the output of which is coupled to the output of said source follower.

8. The AGC circuit of claim 6, further including a constant current generator driver coupling the charging pulses of said oscillator to said charge generator.

9. The AGC circuit of claim 8 wherein said astable oscillator is transformer coupled to said constant current generator driver.

10. The AGC circuit of claim 9 wherein said charge generator includes means for controlling the charging current of said capacitor.

References Cited

UNITED STATES PATENTS

| | | | |
|---|---|---|---|
| 2,687,472 | 8/1954 | Ingals et al. | 325—411 |
| 3,470,480 | 9/1969 | Smart et al. | 325—400 |

ROBERT L. GRIFFIN, Primary Examiner

A. J. MAYER, Assistant Examiner

U.S. Cl. X.R.

325—400, 401, 404, 405, 414, 425